(12) United States Patent
Evans et al.

(10) Patent No.: US 7,582,235 B2
(45) Date of Patent: *Sep. 1, 2009

(54) METHOD OF MANUFACTURING OPTICAL-QUALITY POLARIZED PART INCORPORATING HIGH-IMPACT POLYURETHANE-BASED MATERIAL

(75) Inventors: Russell E. Evans, Chino Hills, CA (US); Thomas A. Balch, Rancho Palos Verdes, CA (US); Nancy L. S. Yamasaki, Long Beach, CA (US)

(73) Assignee: Younger Mfg. Co., Torrance, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 10/624,925

(22) Filed: Jul. 21, 2003

(65) Prior Publication Data

US 2004/0017610 A1 Jan. 29, 2004

Related U.S. Application Data

(60) Division of application No. 09/804,785, filed on Mar. 13, 2001, now Pat. No. 7,002,744, and a continuation-in-part of application No. 09/447,445, filed on Nov. 22, 1999, now Pat. No. 6,391,231.

(60) Provisional application No. 60/109,498, filed on Nov. 23, 1998.

(51) Int. Cl.
*B29D 11/00* (2006.01)

(52) U.S. Cl. .................... 264/1.32; 156/99; 264/1.7; 425/808

(58) Field of Classification Search .............. 264/1.1, 264/1.31, 1.32, 1.7, 1.9; 425/808; 156/60, 156/99

See application file for complete search history.

(56) References Cited

U.S. PATENT DOCUMENTS

| | | | |
|---|---|---|---|
| 3,051,054 A | 8/1962 | Crandon | 88/65 |
| 3,833,289 A | 9/1974 | Schuler | 350/155 |
| 3,846,013 A | 11/1974 | Cohen | 350/147 |
| 3,881,683 A | 5/1975 | Whitney | 249/117 |

(Continued)

OTHER PUBLICATIONS

Plastics Engineering Handbook of the Society of the Plastics Industry, Inc., Third Edition, *Reinhold Publishing Corporation*, New York, pp. 492-493 (1960).

(Continued)

*Primary Examiner*—Mathieu D. Vargot
(74) *Attorney, Agent, or Firm*—Sheppard, Mullin, Richter & Hampton LLP

(57) ABSTRACT

Optical-quality polarized parts and methods for manufacturing the optical parts are disclosed. The optical-quality polarized parts comprise a high impact, lightweight, high optical quality polyurethane construct and a polarizer bonded to the construct. The construct may be a lens substrate wherein the polarizer is integrally bonded at or near the front surface of the lens substrate. A sidefill gasket may be used to support and position the polarizer within a mold cavity for reproducibly forming the optical part. The polarizer may comprise a polyethylene terephthalate film or a laminated polyvinyl alcohol film or wafer. The polarized optical part- has improved impact resistance over conventional thermoset resin parts, as well as better optical properties than similarly impact-resistant polycarbonate constructs.

17 Claims, 7 Drawing Sheets

U.S. PATENT DOCUMENTS

| | | | | |
|---|---|---|---|---|
| 3,940,304 A | 2/1976 | Schuler | ................... | 156/245 |
| 4,090,830 A | 5/1978 | Laliberte | ................... | 425/117 |
| 4,227,073 A | 10/1980 | Goodwin et al. | ................... | 249/117 |
| 4,268,127 A | 5/1981 | Oshima et al. | ................... | 350/337 |
| 4,274,717 A | 6/1981 | Davenport | ................... | 351/169 |
| 4,352,776 A | 10/1982 | Weisner et al. | ................... | 264/522 |
| 4,418,992 A | 12/1983 | Davenport et al. | ................... | 351/169 |
| 4,427,741 A | 1/1984 | Aizawa et al. | ................... | 428/332 |
| 4,617,207 A | 10/1986 | Ueki et al. | ................... | 428/1 |
| 4,693,446 A * | 9/1987 | Orlosky | ................... | 249/53 R |
| 4,756,953 A | 7/1988 | Utsumi | ................... | 428/220 |
| 4,824,882 A | 4/1989 | Nakamura et al. | ................... | 524/89 |
| 4,873,029 A | 10/1989 | Blum | ................... | 264/1.3 |
| 4,929,707 A * | 5/1990 | Nagata et al. | ................... | 528/76 |
| 5,049,427 A | 9/1991 | Starzewski et al. | ................... | 428/40 |
| 5,051,309 A | 9/1991 | Kawaki et al. | ................... | 428/332 |
| 5,059,356 A | 10/1991 | Nakamura et al. | ................... | 252/585 |
| 5,071,906 A | 12/1991 | Tanaka et al. | ................... | 524/557 |
| 5,084,226 A | 1/1992 | Tarlton et al. | ................... | 264/316 |
| 5,110,514 A * | 5/1992 | Soane | ................... | 264/496 |
| 5,286,419 A | 2/1994 | van Ligten et al. | ................... | 264/1.3 |
| 5,434,707 A | 7/1995 | Dalzell et al. | ................... | 359/485 |
| 5,641,372 A | 6/1997 | Okuno | ................... | 156/230 |
| 5,702,813 A | 12/1997 | Murata et al. | ................... | 428/332 |
| 5,718,849 A | 2/1998 | Maus et al. | ................... | 264/2.2 |
| 5,746,949 A * | 5/1998 | Shen et al. | ................... | 252/585 |
| 5,751,481 A | 5/1998 | Dalzell et al. | ................... | 359/485 |
| 5,757,459 A | 5/1998 | Bhalakia et al. | ................... | 351/168 |
| 5,800,744 A | 9/1998 | Munakata | ................... | 264/1.7 |
| 5,808,721 A | 9/1998 | Wood et al. | ................... | 351/159 |
| 5,811,506 A | 9/1998 | Slagel | ................... | 528/64 |
| 5,827,614 A | 10/1998 | Bhalakia et al. | ................... | 428/411.1 |
| 5,830,578 A | 11/1998 | Ono et al. | ................... | 428/446 |
| 5,867,316 A | 2/1999 | Carlson et al. | ................... | 359/500 |
| 5,882,774 A | 3/1999 | Jonza et al. | ................... | 428/212 |
| 5,926,310 A | 7/1999 | Tamura et al. | ................... | 359/350 |
| 5,962,617 A | 10/1999 | Slagel | ................... | 528/61 |
| 5,965,247 A | 10/1999 | Jonza et al. | ................... | 428/212 |
| 5,991,072 A | 11/1999 | Solyntjes et al. | ................... | 359/361 |
| 5,997,139 A | 12/1999 | Yasuda | ................... | 351/49 |
| 6,096,375 A | 8/2000 | Ouderkirk et al. | ................... | 427/163.1 |
| 6,113,811 A | 9/2000 | Kausch et al. | ................... | 252/585 |
| 6,127,505 A | 10/2000 | Slagel | ................... | 528/61 |
| 6,220,703 B1 * | 4/2001 | Evans et al. | ................... | 351/163 |
| 6,391,231 B1 * | 5/2002 | Evans et al. | ................... | 264/1.7 |
| 6,638,450 B2 * | 10/2003 | Richard | ................... | 264/1.32 |

OTHER PUBLICATIONS

Liston, Edward M., "Plasma Treatment for Improved Bonding: A Review," 3 5th Sagamore Army Materials Research Conference, pp. 199-218 (1988)

Rodriguez, Ferdinand, "Principles of Polymer Systems," *Hemisphere Publishing Corporation*, Third Edition, pp. 20-27 and 484-487 (1989).

Hollander, A. et al "The Influence of Vacuum-Ultraviolet Radiation on Poly(ethlene terephthalate)," *Journal of Polymer Science Part A: Polymer Chemistry*, Vol. 34, 1511-1516 (1996).

Glocker, David, et al., "Plasma Sources for Polymer Surface Treatment," Handbook of Thin Film Process Technology (1996), pp. 1-38.

* cited by examiner

METHOD OF MANUFACTURING OPTICAL-QUALITY POLARIZED PART INCORPORATING HIGH-IMPACT POLYURETHANE-BASED MATERIAL

CROSS-REFERENCE TO RELATED APPLICATIONS

This is a division of U.S. patent application Ser. No. 09/804,785, filed Mar. 13, 2001, now U.S. Pat. No. 7,002,744, and is a continuation-in-part of U.S. patent application Ser. No. 09/447,445, filed Nov. 22, 1999, and now U.S. Pat. No. 6,391,231, which claims priority from Provisional Application No. 60/109,498, filed Nov. 23, 1998.

BACKGROUND OF THE INVENTION

The field of the present invention relates to the use of high impact, lightweight, high optical-quality polymeric material in polarized plastic parts such as eyewear.

Optical-quality eyewear requires good optical performance. In the selection of lens materials for use in optical-quality eyewear, the color, weight, and safety of the material is important, as well as good optical performance. Most often, however the respective properties of different materials necessitate trade-offs among the desired lens characteristics. For instance, glass has very good optical properties, but it is heavy (a dense material) and only impact resistant if thick (resulting in an even heavier lens). Polymeric thermoset resins, such as CR-39®, are lighter in weight but are lacking in impact resistance. Polycarbonate, in contrast, is both lightweight and highly impact resistant. Polycarbonate also has a high refractive index. Thus, thin lenses can be made utilizing polycarbonate. However, polycarbonate exhibits more chromatic aberration than glass, typically resulting in unacceptable off-axis distortion.

In light of the foregoing, an alternate material with both good optics and high impact resistance is desirable. In addition, a lightweight material is desired for the wearer's comfort, convenience, and fashion consideration.

U.S. Pat. No. 5,962,617 ("'617 patent") describes an initial formulation of a prototype material, which the inventors recognized may provide an improved combination of lens characteristics. This material comprises polyurethane pre-polymer compositions, the reaction product of such pre-polymer compositions, and the diamine curing agent used in their reaction. While this material may offer improved lens characteristics over conventional materials, the inventors noted that it has too much residual yellowness for an acceptable standard ophthalmic lens. In addition, when the inventors worked with the disclosed prototype material to try to manufacture lenses, they noted that it does not have sufficient structural integrity to maintain an accurate optical power when surfaced with standard optical grinding, polishing, and edging techniques.

Due to the foregoing deficiencies, in order for the prototype material disclosed in the '617 patent to be an acceptable lens material, the inventors had the formulation modified (hereinafter "modified high impact polymeric material"). In particular, the inventors added dyes or colorants to obtain the specific requirements of a standard ophthalmic lens. The inventors also added stabilizers to protect the polyurethane component of the disclosed material from oxidation. Finally, the inventors modified the disclosed material's chemistry and component ratios to improve its structural integrity.

As shown in Table 1, the modified high impact polymeric material compares quite favorably with conventional optical lens materials in its combination of physical properties. Notably, the modified high impact polymeric material exhibits very low birefringence. This property is an especially useful attribute in combination with polarizers. Briefly, the polarizer in optical-quality eyewear has been aligned to preferentially remove most of the glare (plane polarized reflections) from horizontal surfaces. If a material has a high degree of birefringence (that is, if its crystal structure causes incoming light to be polarized significantly differently along different crystal planes), it will affect the apparent efficiency of a polarizing lens. If a birefringent material is now placed in the light path before the polarizer, some of this plane-polarized light will be redirected into other orientations such that the polarizer alignment will not block as much of the incoming light. The result is that the lens will be far superior to a tinted lens in blocking glare (since tinted lenses have no preferential absorption or reflection for plane polarized glare), but it will also not be as efficient as a lens without birefringent materials.

After modifying the prototype material disclosed in the '617 patent and analyzing its physical properties, the present inventors recognized that their modified high impact polymeric material could possibly be used in the manufacture of improved optical-quality plastic parts. The present inventors also recognized that if their modified high impact polymeric material could be combined with a polarizer, they might be able to provide the marketplace with improved polarized eyewear. Such optical-quality polarized parts include, but are not limited to, semi-finished, finished prescription and non-prescription lenses, facemasks, shields, goggles, visors, and display of window devices.

Initial tests, however, led the inventors to believe that their modified high impact polymeric material could not be utilized to manufacture optical-quality polarized plastic parts. In early attempts to combine their modified high impact polymeric material with standard polyvinyl alcohol (PVA) polarized film using conventional techniques, the film was consistently displaced and bent out of shape during the introduction of the material. Thus, initial testing revealed that substitution of their high impact material for standard lens thermoset resin materials and conventional manufacturing processes was not possible.

Analysis of the initial testing further revealed that the properties of their modified high impact polymeric material greatly contributed to the inventors' failure to incorporate it into an improved optical-quality, polarized plastic part. Briefly, casting of polarized lenses and other eyewear requires controlled and reproducible positioning of the film or supported polarizer within the solidifying polymer. Gasket designs and certain conventional filling techniques typically help to control the positioning of the film during standard lens casting. It is not uncommon to spend 10 to 15 seconds filling the assembly with resin to ensure even flow and controlled distribution of the resin around the polarizer layer. However, their modified high impact polymeric material solidifies more quickly than standard thermoset resins (approximately 30 seconds rather than several hours). Thus, standard PVA polarized film was consistently displaced and bent out of shape during the introduction of the material due, at least in part, to the quick setting time of the material.

In a similar manner, the polarization or other essential physical properties of standard polarizing film can be compromised by the heat of the polymer's solidification process or by reaction with the monomers of the pre-mix. The modified high impact polymeric material creates considerable heat within the mold assembly during its normal, exothermic curing process. This can soften the polarizer or supporting layers, causing further displacement of the polarizing film. Depending on the polarizers or polarizing materials used, this heat could also change the color or decrease the efficiency of a polarizer. Organic dyes used as polarizers would be especially susceptible to this type of damage.

Thus, the inventors recognized that existing manufacturing processes suggested that high impact polyurethane-based material could not be used to effect an optical-quality plastic part due to the fundamental difficulty of handling the fast-reaching modified high impact polymeric material, in combination with the more demanding process of reproducibly positioning a polarizer within any optical construct, while maintaining the optical and mechanical performance of the part. If high impact polyurethane material could be incorporated into an optical-quality plastic part, a desirable product would be effected.

SUMMARY OF INVENTION

The preferred embodiments relate to optical-quality polarized parts and to methods of manufacturing such optical parts comprising a high impact, lightweight, high optical quality polyurethane-based material and a polarizer. The polarized optical part advantageously has improved impact resistance over conventional thermoset resin parts, as well as better optical properties than similarly impact-resistant polycarbonate constructs.

BRIEF DESCRIPTION OF THE DRAWINGS

The various objects, features and advantages of the present inventions may be better understood by examining the Detailed Description of the Preferred Embodiments found below, together with the appended, figures, wherein.

Table 1 shows a comparison of different materials' physical properties relevant to optical applications, including the inventors' modified high impact polyurethane-based material.

DETAILED DESCRIPTION OF THE PREFERRED EMBODIMENTS

The preferred embodiments will now be described with respect to the drawings. To facilitate the description, any numeral identifying an element in one figure will represent the same element when used in any other figure.

Figure 1:
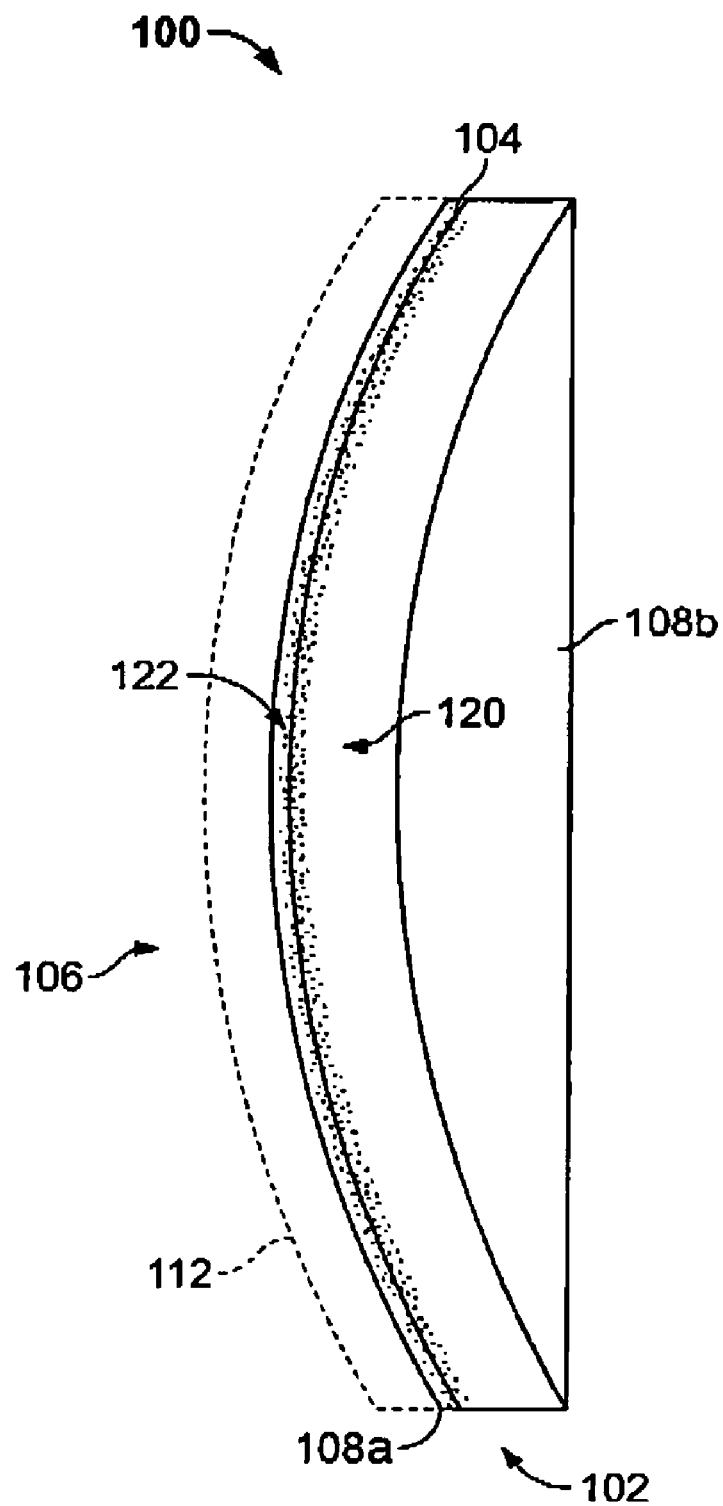
FIG. 1 shows an optical-quality polarized part constructed according to a preferred embodiment, wherein the part comprises a high impact polyurethane-based optical lens substrate and a polarizer integrally bonded to the lens substrate.

FIG. 1 illustrates an optical-quality plastic part 100, particularly a polarized lens, comprising a high impact, lightweight, high-optical quality polymeric construct 102 and a polarizer 104 bonded thereto. The part 100 has been manufactured according to one of the embodiments as disclosed and illustrated herein such that the polarizer 104 may be "integrally bonded" (interpenetrated bonding or bonding at the molecular level) to the optical construct or lens substrate 102. Advantageously, the optical-quality plastic part 100 has improved impact resistance over conventional thermoset resin parts, as well as better optical properties than similarly impact-resistant polycarbonate constructs.

Turning in detail to FIG. 1, polarizer 104 is a polarizing film bonded near the front surface 106 of the lens substrate 102. Polarizer 104 may alternatively be bonded at the front surface 106, however, being bonded near the front surface 106, film 104 is interposed between first and second members 108a, 108b of substrate 102. First and second members 108a and 108b may be either discrete parts, or liquid monomer or polymer mixtures that are placed in contact with the polarizer and allowed to solidify. In this manner, the first member 108a of the lens material 102 protects the film 104 such that there may be no need to hardcoat it. However, to protect the first member 108a from abrasion and undue wear, member 108a may optionally be hardcoated. As the hard coating 112 is optional, it is shown in dashed lines.

Figure 2:
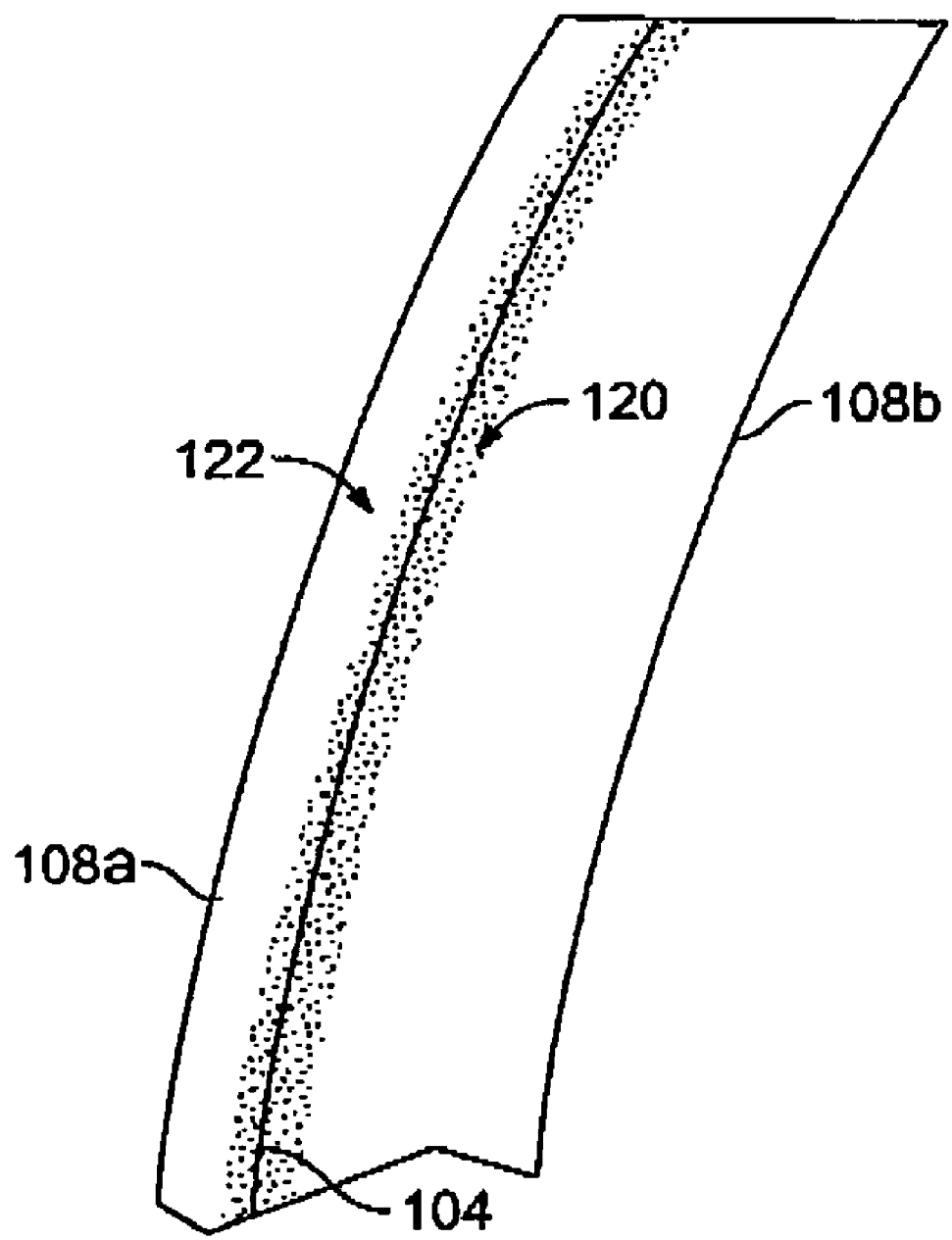
FIG. 2 shows a detailed view of the integral bond between the polarizer and the lens substrate illustrated in FIG. 1.

Both sides of the polarizer 104 may be surface treated, either physically and/or chemically, to effect an integral bond 120 between the film 104 and the second substrate member 108b and an integral bond 122 between the film 104 and the first substrate member 108a. Bonds 120, 122 are shown in detail in FIG. 2.

The high impact, lightweight, high-optical quality construct 102 preferably comprises a polyurethane-based material, comprising a polyurethane pre-polymer reacted with a diamine curing agent. Such a high impact polyurethane-based material is disclosed in the '617 patent, which patent is incorporated herein by reference as if fully set forth herein. As the '617 patent indicates, the polyurethane-based material may be prepared by first producing a prepolymer by reacting one equivalent of a polyester glyclol or a polyether glycol having a weight average molecular weight of between about 600 and about 1200 with 4,4'-methylenebis(cyclohexyl isocyanate) in an equivalent ratio of 2.5 to 4.5 NCO for each OH, with a preferable ratio of about 3 to 3.5 NCO for each OH. The prepolymer is then reacted with an aromatic diamine curing agent such as 4,4'-methylenebis(3-chloro-2,6-diethyl)benzamine in an equivalent ratio of 0.95 to 1.02 $NH_2$/1.0 NCO.

The high impact, lightweight, high optical quality construct 102 more preferably comprises a modified version of the prototype material disclosed in the '617 patent. The inventors prefer their modified high impact polyurethane-based material because the prototype material disclosed in the '617 patent has too much yellowness and insufficient structural integrity for an acceptable standard ophthalmic lens. The modified high impact polymeric material particularly comprises up to 12 molar percent trimethylol propane in the prepolymer to improve material stiffness, rather than the lower 4-8% disclosed in the '617 patent. For ophthalmic lens materials, the same preferred aromatic diamine curing agent is reacted with the prepolymer in an equivalent ratio of 0.9 to 1.1 $NH_2$:NCO. Diethyl toluene diamine has also been used as the curing agent for ophthalmic lens applications.

For improved optical product performance (such as resistance to sunlight and heat discoloration, and cosmetic color preferences), the high impact polyurethane material may be modified with the addition of dyes, colorants, anti-oxidants, and ultraviolet (UV) and thermal stabilizers. For instance, WV stabilizers, UV absorbers, antioxidants and dyes such as those commonly available from companies such as Ciba Geigy may be added up to a few percent by weight to alter the color or environmental stability of the material. In one preferred mixture, up to 1% each of Irganox 1010 (an antioxidant and thermal stabilizer), UV stabilizer Tinuvin 328, and UV absorber Tinuvin 765 (all from Ciba Geigy) were added for improved lifetime stability.

Polarizer 104 may comprise a variety of different constructions and materials. Such constructions include freestanding or non-laminated polarized films, films with removable protective sheeting, and films with outer permanent protective coatings or supportive plastic layers.

Surprisingly, the inventors found that the rapid exothermic polymerization reaction of the present high impact polyurethane result in good adhesion to polarizer wafers. Typically used with thermoplastic parts, wafers comprise protective plastic layers on one or both sides of a polarizer film to increase the environmental durability and ease in handling of the polarizers. Three layer wafer constructs sandwich the polarizing film for protection and support on both surfaces. Two layer wafers (alternate material/polarizer film) may provide a supporting layer on one surface, or a single protective convering toward the outer surface of the optial part. Wafers, however, being thicker and usually laminated often do not conform to highly curved or non-symmetrically curved shapes and subsequently separate at the lamination interfaces due to stress fracturing. In addition, such wafers may require the much higher temperatures of thermoplastic processing in order to conform to such shapes, or to join reliably with the introduced lens materials. Resin temperatures in thermoplastic molding are commonly in the range of 260-320° C. rather than the 70-130° C. used in thermoset resin casting. Due to the foregoing deficiencies, wafers are not commonly used with thermoset resins.

The inventors thus were unexpectedly surprised to discover that polarizer 104 may also be a wafer construct. Preferably, the wafer is a polycarbonate/PVA/polycarbonate layered combinations less than 1 mm thick. While such wafers are used in high temperature thermoplastic polycarbonate lens molding, the inventors believed such a wafer would have a lack of conformity and a high degree of delamination in the present lower temperature application. Such concerns were heightened because the polycarbonate outer layer and the disclosed high impact polyurethane are inherently dissimilar materials. Materials other than polycarbonate for the wafer construct may also comprise poly(methyl methacrylate), polystyrene, cellulose acetate butyrate (CAB), cellulose acetate, and cellulose triacetate.

With respect to materials of a freestanding polarizing film, these preferably include polyethylene terephthalate (PET) films, although PVA films may be used. PET polarizers, as disclosed in U.S. patent application Ser. No. 6,220,703, which is hereby incorporated by reference, are preferred because they are stable and exhibit low birefringence, among other beneficial properties. Notwithstanding PET's potential advantages, the inherent inertness of PET should be overcome for the manufactured optical product to have adequate structural integrity. Thus, to effectively incorporate PET film as polarizer 104, methods to overcome PET's inertness for bonding should be employed. Such methods are fully disclosed in the above-identified patent application and U.S. Pat. No. 6,413,641, which is hereby incorporated by reference.

Other polarizing films may include thin, multilayered polymeric materials, combined reflective and dichroic polarizers, or films of mixed polymeric phases such as those described in U.S. Pat. Nos. 5,882,774; 6,096,375, and 5,867,316, and references respectively cited therein, all of which are incorporated herein by reference.

Polarizer 104, as detailed below, may be protected by a variety of permanent coatings applied to the outer surface to provide increased resistance to scratches and environmental degradation.

Turning again to the drawings, FIGS. 3-6 illustrate various production techniques for in situ solidification of the high impact polymeric material against or around the polarizers, or subsequent bonding of the polarizer to a formed polymeric optical part. The disclosed and illustrated methods may effect a variety of optical parts that include but are not limited to semi-finished lenses, finished lenses, non-prescription lenses, facemasks, shields, goggles, visors, and display of window devices.

To elaborate, as shown in FIGS. 3-6, the exemplary manufacturing processes may yield a finished part ready for an intended optical application. Alternately, they may yield an optical part in preparation for further processing into another shape or for incorporation into a larger instrument or system. For example, the processes of FIGS. 3-6 illustrate steps that can be used to form a finished polarized lens ready for final insertion into a eyeglass frame, helmet or goggle; a prescription or non-prescription polarized lens blank to be edged to final shape and inserted into a frame; or a semi-finished polarized lens blank that must be surfaced, polished and edged to a final prescription and shape before being inserted into frames. Similarly, optical parts for displays or windows could be prepared to final shape and size, or manufactured via the processes of FIGS. 3-6 as large parts that are subsequently cut, shaped, formed or further processed to final articles.

Figure 3:
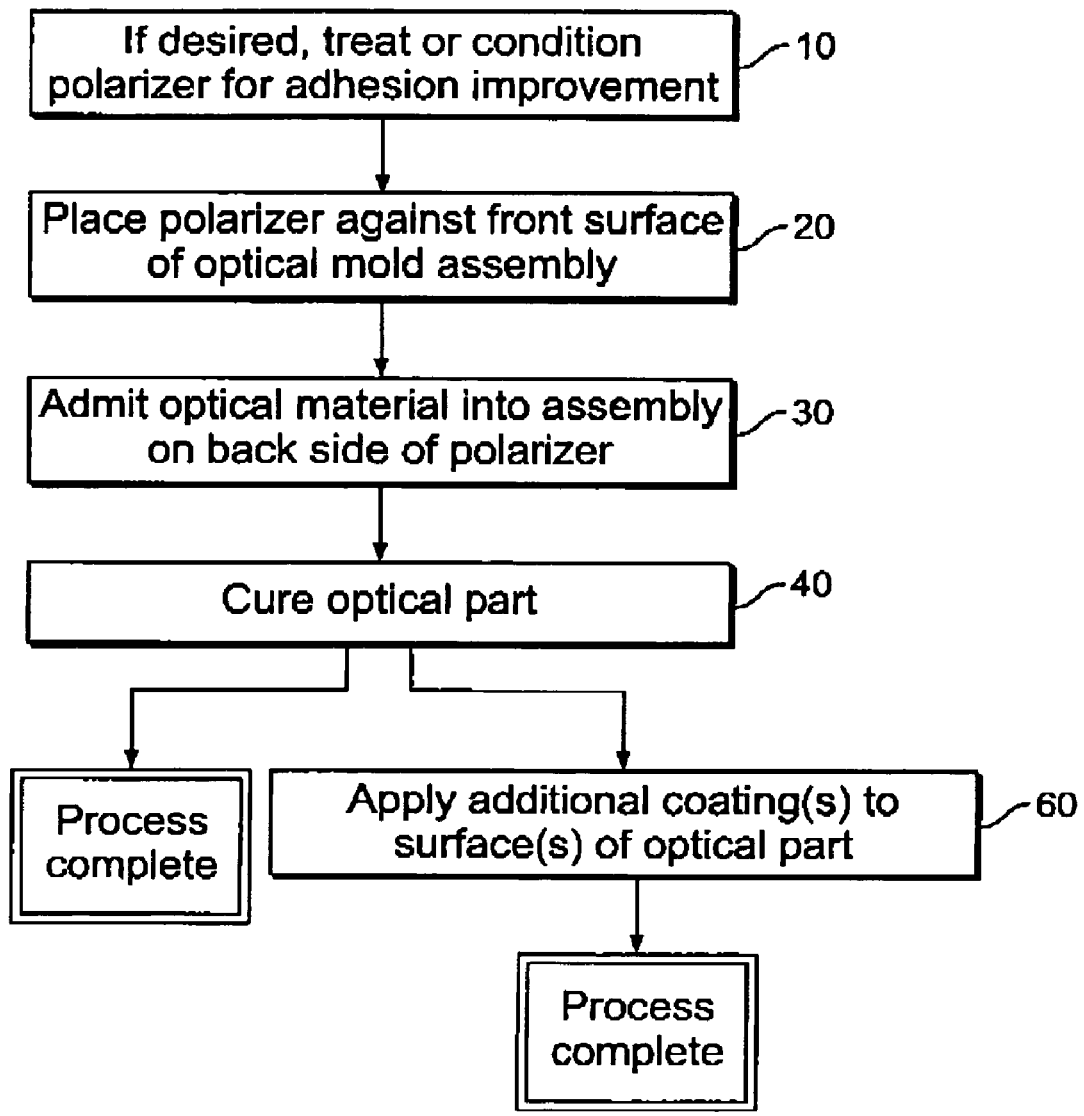
FIG. 3 is a flowchart illustrating a method of manufacturing an optical-quality polarized part according to a preferred embodiment and particularly a method of one-sided fill of the optical part.

As illustrated in FIG. 3, the polarizer, such as polarizer 104, may be treated for improved adhesion at step "If desired, treat or condition polarizer for adhesion improvement." Previously reported treatments of polarizers, such as nitrocellulose coatings on CAB polarizer wafers (U.S. Pat. No. 3,833,289) and polyvinyl butyral coating on polarizer sheets (U.S. Pat. No. 4,090,830), did not prove reliable for ophthalmic lens processing. Therefore, the inventors investigated alternate coatings, as well as chemical and/or physical treatments of polarizer films, for improved adhesion. Details of surface treatments and chemistries for improved bonding are disclosed in U.S. application Ser. Nos. 09/475,424 and 09/567,711 mentioned previously. Such treatments include mechanical roughening, physical cleaning, chemical surface modification, plasma activation, and coating of the polarizers.

Treatments may be tailored to the chemical and/or physical characteristics of the polarizer to be used, the polarizer's position within the optical construct, such as construct 102, and the stage at which it is incorporated into the optical construct. For example, in FIG. 3, it may be appropriate or necessary to treat only the surface that will contact the polymeric material. In particular, single, inner surface treatment is preferred if the treatments of choice are mechanical roughening of a wafer polarizer, or high tack coating of either wafer or film polarizers.

At step 20 "Place polarizer against front surface of optical mold assembly," the polarizer is advantageously positioned against one surface (designated the front) of a mold assembly, such as a lens mold assembly. Thus, if a polarized wafer is used, for example, the resulting benefit is that the outermost layer of the wafer becomes the front surface of the lens. This alone or with subsequent hard coating can give a lens with sufficient scratch resistance for front surface lens requirements. Similarly, the polarizer film may be placed directly at the front surface of the lens cavity if it is of a scratch-resistant material, has been overcoated for protection, or is environmentally stable enough (such as the PET polarizer or certain constructs of the thin multilayer polarizers) to withstand subsequent direct use or hard coating. This configuration can simplify the lens forming process.

Additionally, depending on what type of polarizer is used, the positioning described in FIG. 3, can give enhanced optical performance because no optical loss due to refractive index mismatches, absorption of additional materials, or birefringent randomization occurs before the polarizer interacts with the light.

With the method illustrated in FIG. 3, the user may also advantageously be able to apply positive or negative pressure against the polarizer to conform it against the front surface before or during the admission of the liquid-phase polymeric material. Such pressure may be accomplished, for example, by using a gasket or cavity sealing mechanism such as that described in U.S. patent application Ser. No. 09/447,445, which application is incorporated herein by reference as if fully set forth herein.

Figure 7:
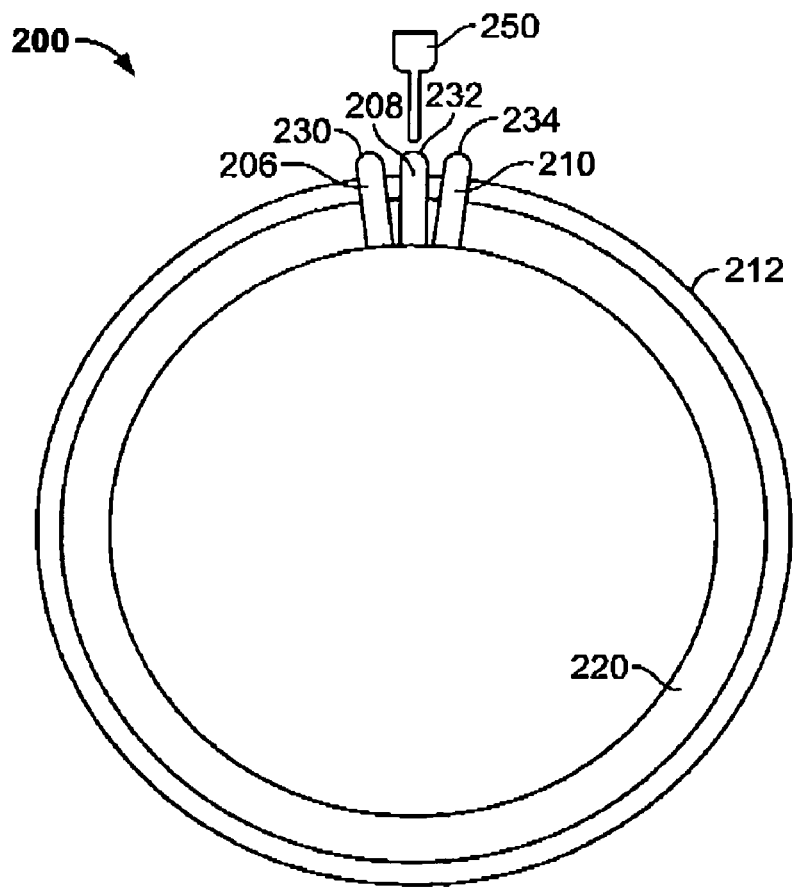
FIG. 7 illustrates a top view of a side fill gasket, as disclosed in U.S. patent application Ser. No. 09/447,445, that may be used to effect an optical-quality part according to a preferred embodiment.
Figure 8:
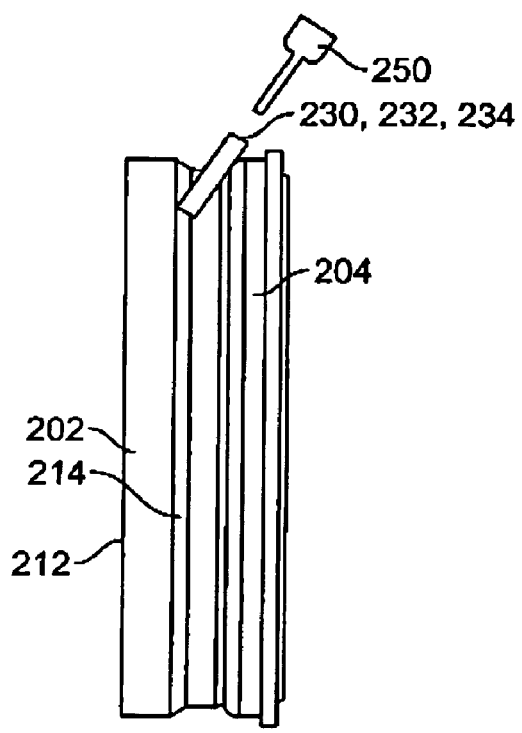
FIG. 8 illustrates a side view of the side fill gasket shown in FIG. 7.

As detailed in that application and as illustrated in FIGS. 7 and 8 herein, an exemplary sidefill gasket 212 is interposed between opposing mold members 202, 204 of a mold assembly 200 to define and seal a lens chamber 214 within which a lens is to be cast. The gasket 212 may comprise an annular body having a shoulder 220 formed on the inside surface thereof. The shoulder 220 accommodates and seals the edges of mold members 202, 204. The gasket 212, as exemplified by the illustrations of FIGS. 7 and 8, may further comprise a plurality of port holes 230, 232, 234 on the outside surface of the annular body. Each hole 230, 232, 234 has a passageway 206, 208, 210 extending through the annular body of the gasket 212 and into the lens chamber 214. The port holes 230, 232, 234 and their respective passageways are adapted to control the fill of the mold assembly (either with or without added pressure) and exhaust any trapped gases produced during filling. A delivery mechanism, such as needle 250, may be used to admit the polyurethane-based material into the lens chamber 214.

An alternative to a gasket mechanism, such as that illustrated in FIGS. 7 and 8, may include a very fine hole made through the front cavity surface, or a series of fine passageways made along the perimeter of the front surface, to pull the polarizer against the front surface via applied vacuum.

The optical mold assemblies employed in step 20 may comprise standard glass molding surfaces, such as those in common practice for forming thermoset resin ophthalmic lenses. Alternately, reaction-injection molding (RIM) cavities may be used. Although RIM molding technology has not previously been used to manufacture ophthalmic lenses, the present high impact polyurethane-based material is well suited to RIM manufacturing. Unlike traditional thermoset lens, technology, RIM molding technology may utilize multiple as well as single cavities. Thus, the disclosed methods of manufacturing may provide a cost and production advantage over conventional individual thermoset lens cavity assemblies or techniques.

At step 30 "Admit optical material into assembly on back side of polarizer," the optical material is introduced into the mold assembly. The high impact polyurethane-based material utilized in the preferred embodiments has a viscosity of approximately 1,000 centipoise. It is commonly maintained prior to use as two pre-mixed components held at room temperature (20-27° C.) and slightly elevated temperature (53-66° C.), respectively. When combined at the point of use, the mixture exothermically reacts and begins to solidify within 30 seconds.

Since this reactive polymeric material solidifies so quickly, the inventors, through their initial failures, recognized that conventional techniques that depend on solidification lasting several hours could not be used. In order for an acceptable optical-quality plastic part to be effected, the inventors turned to one of their earlier inventions. In particular, the inventors turned to their sidefill gasket technology disclosed in U.S. patent application Ser. No. 6,391,231. Sidefill gaskets and methods as detailed therein incorporate extra vents to remove entrapped gases either by passive or active (e.g., vacuum) methods. A further refinement may include automation for reproducible and accurate filling.

At step 30, the inventors prefer their sidefill gasket technology because it advantageously provides a means to remove trapped air from the mold assembly, as well as direct and control the material's introduction into it, within the incredibly short thirty-second set time. With such a short set time, it is very easy to entrap bubbles in the lens, which cause unacceptable defects in the final product. In addition, because of the quick set time, solidifying lens material is likely to draw back from inlet location and cause edge defects. While the total percentage of material shrinkage may be less than other thermoset materials, the evidence of shrinkage will be more obvious in any area, such as a fill port, where the material is unsupported in at least one dimension and hence can shrink unevenly. Therefore, the sidefill technology also advantageously provides a reservoir of extra material that will flow into the inlet as it solidifies to minimize such edge defects. Accordingly, by utilizing the inventors' unique sidefill gasket technology, a user may securably position the polarizer within the mold assembly, and then control and direct the liquid-phase polymeric material on or around the polarizer during this critical manufacturing stage.

As shown in FIG. 3, while the polyurethane-based material solidifies quickly, the complete conversion to a stable final polymer requires curing at step 40 "Cure optical part." The cure process requires several hours at, room temperature. A controlled elevated temperature, or a ramped increase to an elevated temperature, is preferred for more reproducible production times and final optical and mechanical properties. Preferably, the elevated temperature is maintained in the range of 110-130° C. Higher temperatures may result in yellowing of the material from reactive decomposition.

Two exemplary sequences for curing optical parts are:

1. Fill cavity of the mold assembly at room temperature. Within 10 minutes (when polymeric material has gelled to inhibit flow during movement), place the mold assembly in an oven at 121° C. Cure in mold assembly for 16-18 hours, then remove the optical part from the assembly; or 2. Fill cavity of the mold assembly at room temperature. Place assembly in oven at 121° C. for 3 hours. Remove optical part from assembly and continue curing part in a 121° C. oven for an additional 15 hours.

Step 40 may be the final step in the manufacturing process if the resultant part is sufficiently robust for its intended optical environment. The polarizer chosen and the intended use of the part determine sufficient robustness. For instance, one could not use a PVA polarizer in the process of FIG. 3 and end the process at step 40 if the part were exposed to water or high humidity in its intended use—the polarized part would lose efficiency and the polarizer may deform or delaminate under humid conditions. Moreover, as noted in the Background of the Invention, supra, due to the high heat of reaction of the polyurethane-based material, the PVA polarizer may be severely damaged such that the user may discover that use of this type of polarizer is not advisable. For most applications, the inventors prefer PET polarizing film, if it can be bonded according to the inventors' techniques disclosed in their earlier-identified applications, because this film can better withstand high heat compared to standard films such as PVA films. Thus, depending on application, an outer PET polarizer layer or polarized wafer may be sufficiently robust for expected wear.

As an option, additional scratch-resistant or hard coatings may be preferred, as illustrated by step 60 "Apply additional coating(s) to surface(s) of optical part." Such coatings are normally applied to eyewear and other exposed optical parts to increase their lifetime in standard use or to enhance their optical properties. These coatings may be applied to front, back, or all surfaces (including edges) as needed to protect or enhance the parts. Similarly, different coatings may be applied to different surfaces (e.g., a scratch resistant coating on one surface, and a tinted or mirror coating on another).

Several commercial coatings for enhanced scratch, rub and wear resistance, as well as increased environmental stability, are available for ophthalmic lenses or other optical parts. Such coatings may be applied in the liquid state by roll, spin or dip coating, for example. Depending on the chemistry of the coating solution, the liquid film is converted to a harder, solid layer by thermal, ultraviolet, infrared or other means of irradiation, reactive initiators or other reactive methods. Vacuum-deposited coatings may be applied as an alternate to the liquid coating, or in addition to cured liquid coatings. Such vacuum coatings may provide additional protection from physical wear, environmental degradation, or further control of the optical properties of the part. For instance, the liquid or vacuum deposited coatings may alter light throughput in a particular energy region to give anti-reflective or reflective (mirror) properties, alter the perceived color of the part, or reduce exposure to emissions such as infrared or ultraviolet emissions.

As shown in FIG. 3, coating step 60 may be the final step in the basic manufacturing process. For the process outlined in FIG. 3, the final coating step 60 may provide preferred properties for optical parts constructed with a variety of polarizers that include PET films, PVA films, multilayer polarizers, and wafer polarizers.

Figure 4:
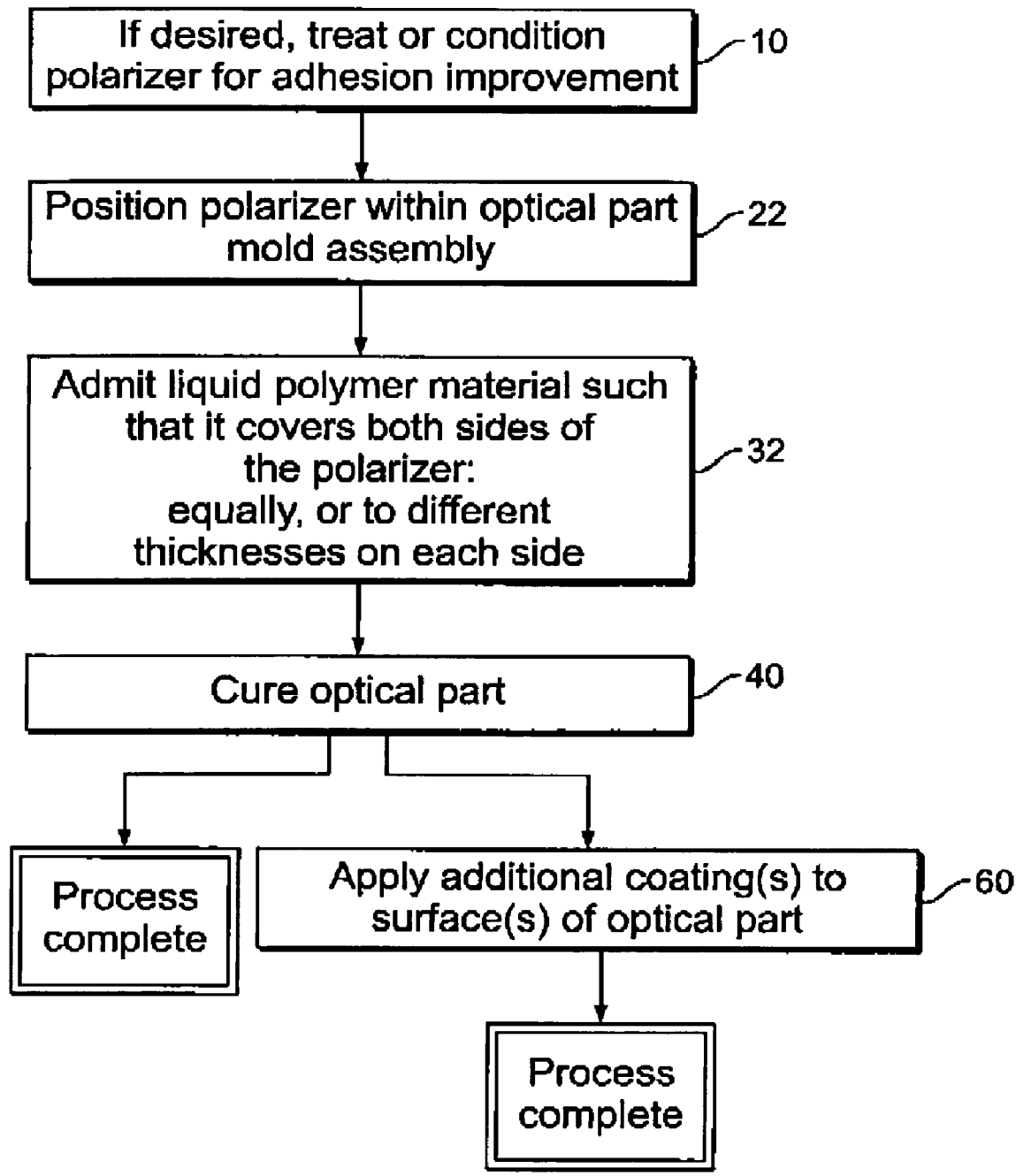
FIG. 4 is a flowchart illustrating a method of manufacturing an optical-quality polarized part according to a preferred embodiment and particularly a method of two-sided simultaneous fill of the optical part.

FIG. 4 illustrates a manufacturing process that positions the polarizer within the bulk of the optical part. This manufacturing approach may be used for better environmental and wear protection for delicate polarizers (such as PVA films) or for demanding applications. For example, certain applications may benefit uniquely from protecting the polarizer securely within the impact resistant polymeric material. These could include safety or shielding helmets, goggles, or glasses, or display and window applications that may be subjected to high wind, pressure, vacuum, or other harsh conditions.

Step 10, as previously discussed, allows treatment, conditioning, coating or other preparations of the polarizing medium for enhanced adhesion and/or integral bonding within the optical part. In this manufacturing process, it may be most preferred to prepare both surfaces of the polarizer for improved adhesion. This can be accomplished, for example, by dip coating for a liquid surface treatment, by simultaneous or sequential exposure for irradiation treatment, and by sequential or simultaneous physical roughening, cleaning, or conditioning of the surface.

At step 22 "Position polarizer within optical part mold assembly," the polarizer is positioned and supported within the mold assembly such that liquid-phase polymer material may be introduced on both sides of the polarizer. This means that the polarizer is not resting against either of the outer molding surfaces. The inventors' gasket assembly disclosed in U.S. application Ser. No. 09/447,445 is a suitable gasket that may be used to support and securely position the polarizer within the thickness of such an assembly. Depending on the final use of the optical part, the polarizer may be positioned equidistantly from each outer molding surface, or nearer one surface than the other. For example, to form a semi-finished ophthalmic lens blank (commonly 6-15 mm total thickness), it is preferable to position the polarizer within 1.5 mm to 0.5 mm of the front molding surface. This ensures that the lens blank can be ground to prescription without cutting into the polarizer, even for lenses with a final center thickness of 2.2 to 1.8 mm. However, for display or non-prescription eyewear applications, it may be preferable to place the polarizer equidistant within the optical part for optimal protection on both sides of the polarizer.

To form the optical polarized part illustrated in FIG. 4, liquid-phase polymeric material is introduced on both sides of the polarizer at step 32. The disclosed gaskets of U.S. Pat. No. 6,391,231 advantageously allow simultaneous introduction of material on both sides of the polarizer layer, thereby preventing displacement of the polarizer as the material quickly reacts and hardens. Such a method of controlled simultaneous introduction is preferred with this quickly solidifying material to avoid flow lines or voids against the polarizer layer that would degrade the optical performance. Similarly, the filling through-hole(s) of these gaskets may be specifically designed to admit equal or differential distribution of the material around the polarizer, as required to achieve equal or dissimilar thicknesses of polymeric material on the front and back surfaces of the polarized optical part. As in FIG. 3, the through-holes also offer an important advantage in providing reservoirs of material to ensure fully filled parts even upon reactive shrinkage, and to allow passages for egress of gases.

Step 40 "Cure optical part" is identical to the previous process, and may be the final, manufacturing step for some optical parts. Since FIG. 4 illustrates a process that encapsulates the polarizer, this may yield a sufficiently robust part with PET, wafer and even the more environmentally sensitive PVA type polarizers.

Alternately, step 60 may be employed to place additional protective or property-enhancing coatings on one or more surfaces of the optical part. Again, this would be a suitable process step for use with a wide range of polarizers, including PET, multilayer polymer, wafer, and PVA-type polarizers.

Figure 5:
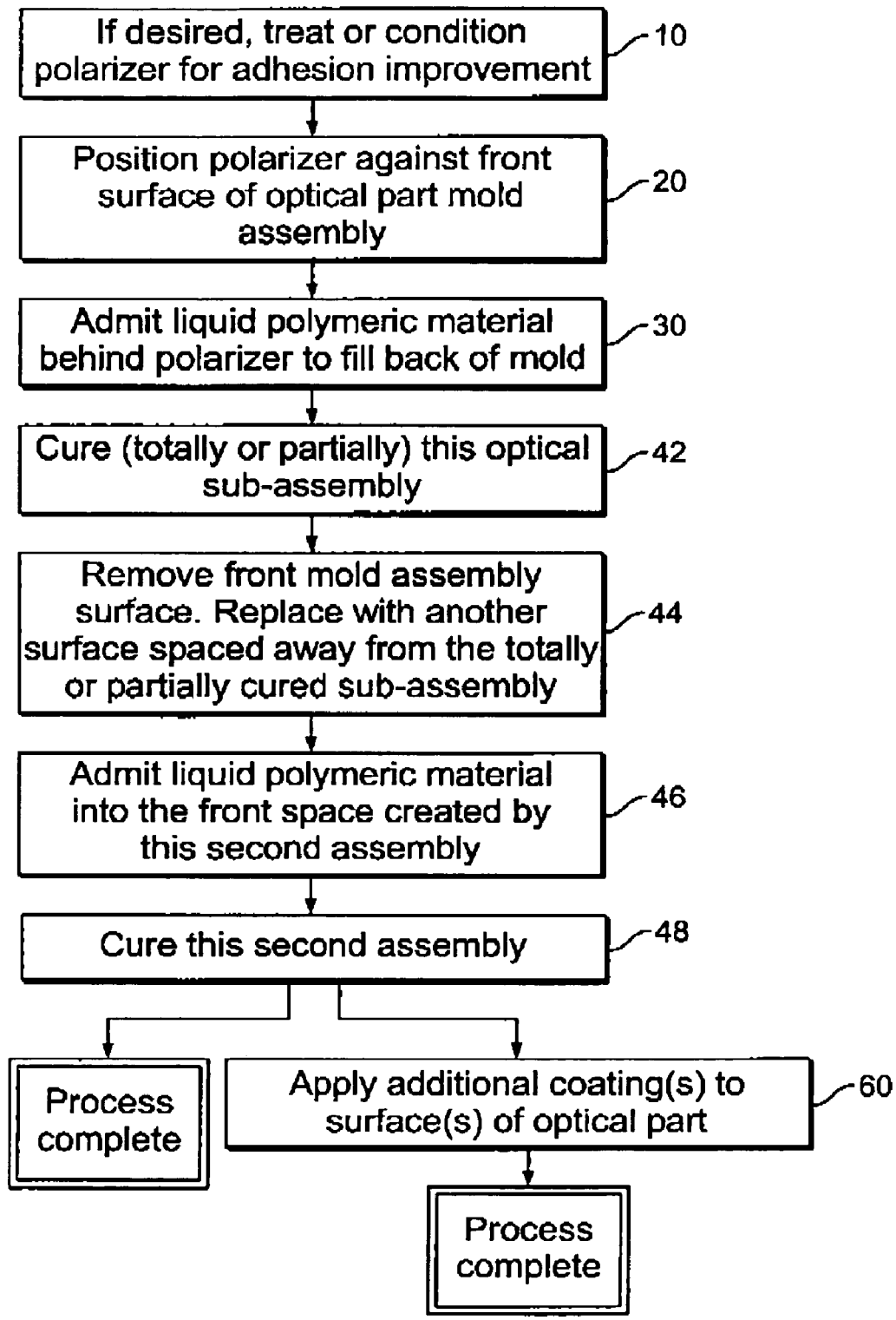
FIG. 5 is a flowchart illustrating a method of manufacturing an optical-quality polarized part according to a preferred embodiment and particularly a method of two-sided sequential fill of the optical part.

FIG. 5 illustrates a manufacturing process for two-sided sequential fill of an optical-quality polarized part. The first three steps are consistent with those previously defined and delineated. However, in this case, the front surface is a "dummy" surface that defines only an intermediate position within the final manufactured optical part. In this approach, the "dummy" surface gives added support to the polarizer that might otherwise be displaced by the viscous lens material; this can be especially useful for thin (e.g., film polarizers of less than 0.2 mm thickness) or fragile materials.

At step 30 "Admit liquid polymeric material behind polarizer to fill back of mold," the liquid polymeric material is introduced only behind the polarizer to press it against the front surface. Again, active or passive means to assist conformance of the polarizer to this surface may be included such as a gasket disclosed by U.S. Pat. No. 6,391,231.

At step 42, the polymeric material is cured in this subassembly either until totally reacted, or until a predetermined, sufficiently stable product is achieved. This can be a reasonable production process because the present polymeric material solidifies much more quickly than standard thermoset resins. Preferably, the part is cured to the point where changes in mechanical stresses and physical dimensions have begun to plateau; if too short a period (10-15 minutes) is employed, the material will be too brittle when removed from the assembly and may crack. A stable plateau may be reached in 1-3 hours, rather than the 10 or more hours required with standard thermoset resins.

At step 44, the front "dummy" surface is removed, and a new surface is positioned and held at a fixed distance from the totally or partially cured subassembly. For an ophthalmic lens, the new surface would be preferably positioned 0.5-1.0 mm above the polarizer. Depending on the design of the optical part, one may use either the same side fill gasket as in step 20, or another gasket that may differ from the first gasket in depth, or number and position of through-holes.

The new surface in step 44 may have a contour identical or different from the previous "dummy" surface,. For example, the following approach could be useful for an optical part with a modulated surface, such as an ophthalmic progressive lens, or a stepped surface such as an ophthalmic bifocal lens. The "dummy" surface could approximate an intermediate curve between a spherical surface and the final surface. Hence the polarizer would be positioned more evenly with respect to the final front surface than if a standard spherical approximation were used. For instance, in a high add power bifocal lens, the displacement in position of the front surface between the distance and reading portion of the lens may be 2 mm or more. A dummy surface could be defined that, for example, allows a 1 mm displacement of the polarizer in the reading portion of the lens to position the polarizer closer to the final front surface.

In step 46 "Admit liquid polymeric material into the front space created by this second assembly," liquid-phase polymeric material is then directed into the newly defined cavity formed by the totally or partially cured sub-assembly and the second, front molding surface. The additional liquid-phase polymeric material is introduced into that cavity to sequentially form the front surface of the lens.

The final portion of the optical part is then cured at step 48, and the process is either completed at this stage or may be further enhanced by additional coatings consistent with the previously-discussed step 60.

This sequential filling process is best suited for use with thin or flexible polarizers, such as those comprising PET, PVA, or the multilayer polymer constructs. PET may be the most preferred for intermediate shaping because of its good conformal properties. However, even the wafer polarizers may be used in this manufacturing approach, if desired.

Figure 6:
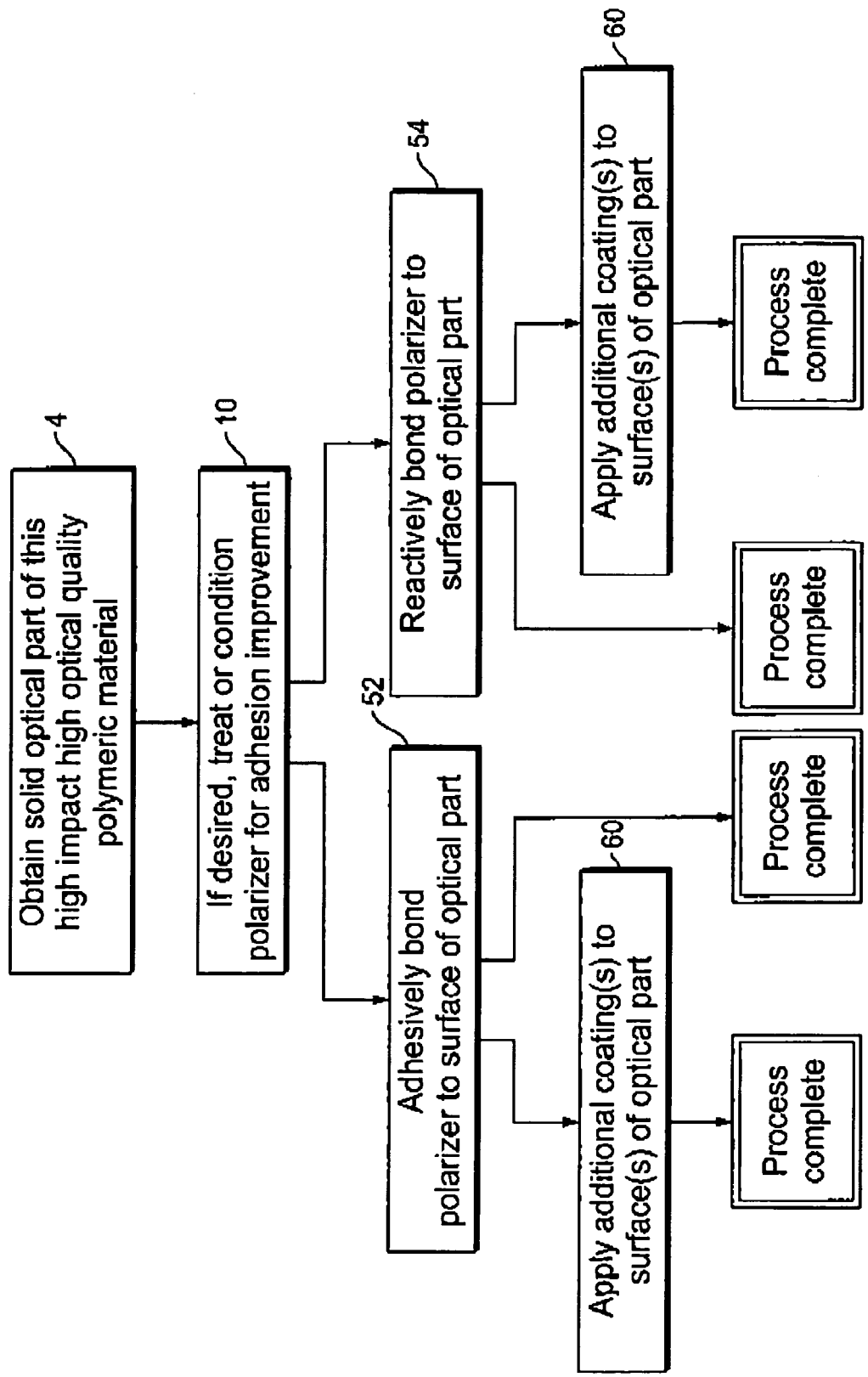
FIG. 6 is a flowchart illustrating a method of manufacturing an optical-quality polarized part according to a preferred embodiment and particularly a method of bonding a polyethylene terephthalate (PET) polarizer to a preexisting solid optical construct.

FIG. 6 illustrates a manufacturing process for bonding a PET polarizer to an existing, solid optical part comprised of the present high impact polyurethane-based material. Hence, FIG. 6 begins with the step of "Obtain solid optical part of this high impact optical quality polymeric material." In step 10, the PET polarizer may be treated for improved adhesion, as discussed above in conjunction with the embodiments illustrated in FIGS. 3-5. One or both surfaces may be treated depending on whether the PET polarizer will form the outer surface (one-sided treatment preferred) or undergo further coating.

Steps 52 and 54 define two different methods to combine the solid optical part or construct with the PET polarizer. In step 52, an optical adhesive is used to bond the polarizer to the optical part's surface. A two part optical adhesive such as HE 17017 available from Hartels Plastics may be used. Step 54, in contrast, involves the reactive treatment or modification of the optical part to effect adhesion to the polarizer. This is a less preferred approach because such treatment may damage the optical quality of the part (e.g., etching leads to surface roughness and scatter) or the physical integrity of the part (e.g., chemical or physical surface and subsurface damage weakens the part toward later chemical or environmental resistance).

For applications with limited handling and exposure, bonding a stable polarizer, for example the PET-type polarizer, to the existing part may be the final step in this manufacturing process. If more wear-resistance is required, coatings may be added in step 60 following either bonding process.

As evidenced by the range of manufacturing processes disclosed herein, many variations are possible which remain within the scope and concept of the invention. The following examples are thus intended as illustrations only since modifications within the scope of the general disclosure will be apparent to those skilled in the art.

EXAMPLES

For convenience and economy, thermoset mold assemblies were used in the following examples.

Adhesion of the lens/film combination was evaluated by cutting a narrow cross-section of the lens, scoring into the lens from the back almost to the front surface, and then breaking the lens along the score line to determine where adhesion is lost. In a few instances, the intrinsic cohesiveness of the polarizer was exceeded before the lens delaminated. This means that a very strong bond was achieved. For weaker bonds, adhesion failure often occurs at the interface between the polarizer and one of its protective layers (for a wafer construct), or between the polarizer and the main lens surface.

Example 1

A conventional thermoset mold cavity was assembled with a PVA polarizer film mounted within the lens cavity. High impact polyurethane-based material was introduced into the cavity and allowed to flow around the polarizer. The lens was allowed to solidify at room temperature for a duration less than 10 minutes (until mixture gels). The lens was allowed to continue its reactive cure at 121 C. for 16 hours.

Results:

| | Polarizer type | Displacement of polarizer? | Adhesion |
|---|---|---|---|
| a. | PVA polarizer film, treated for adhesion | Yes—unacceptable | |

Example 2

This example is representative of the manufacturing method illustrated in FIG. 3. A thermoset mold cavity was assembled with the polarizer resting against the front mold surface. Using a sidefill gasket design as disclosed in U.S. Pat. No. 6,391,231, wherein the gasket has vent holes in addition to a filling port, liquid-phase polyurethane-based material was admitted to only the region of the assembly behind the polarizer film. The lens was allowed to solidify at room temperature for a duration less than 10 minutes (until mixture gels). The lens was placed in an oven to continue its reactive cure at 121° C. for 16 hours.

Results:

| | Polarizer type | Displacement of polarizer? | Adhesion |
|---|---|---|---|
| a. | PET polarizer film UV treated on back surface only | No | Delaminated with edge pressure |
| b. | PET polarizer, untreated | No | Poorer adhesion than a. |
| c. | PC/PVA/PC wafer | No | Yes—PASSED TEST |

Example 3

This example is representative of the manufacturing method illustrated in FIG. 4. A thermoset mold cavity was assembled with a polarizing layer using a sidefill gasket design as disclosed in U.S. Pat. No. 6,391,231. Specifically, a slot-shaped port hole acted as the fill port to introduce, in a controlled manner, the thermosetting resin material along the edge axis of the embedded layer. Two port holes functioning as vent holes were located above the edge axis of the embedded material, i.e., on the thinner side of the lens to allow egress of any gases from the front surface of the lens. An additional vent port was located below the edge axis of the embedded material on the thicker side of the lens to allow egress of any gases from the back lens surface. A curved fill nozzle designed to match the slot-shaped fill port was used to introduce material into the cavity around the polarizing layer until the cavity was full and a small amount of material flowed out of the egress holes. After standard curing as in Example 1, the gasket was removed.

Results:

| | Polarizer type | Displacement of polarizer? | Adhesion |
|---|---|---|---|
| a. | PVA polarizer film | Yes—still unacceptable | Yes |

No gas bubbles were entrapped in the lens during this manufacturing process.

Example 4

This example is representative of the manufacturing method illustrated in FIG. 5. A thermoset mold cavity was assembled with the polarizer resting against the front mold surface. Using another sidefill gasket design as disclosed in U.S. patent application Ser. No. 09/447,445, liquid-phase polymeric material was admitted to only the region of the assembly behind the polarizer film. This material was allowed to solidify for ten minutes, then the front mold surface was removed and another mold surface spaced 1 mm away from the polarizer film was placed in the assembly. Resin was then inserted into this newly formed front lens region to cover the front surface of the polarizer and assume the new front curvature of the lens cavity.

Results:

| | Polarizer type | Displacement of polarizer? | Adhesion |
|---|---|---|---|
| a. | PVA polarizer film | Yes—unacceptable | Yes |

The back lens portion (that formed first) cracked. This result may have been due to uneven pressures on the assembly during removal and replacement of the front molding surface. A longer intermediate curing cycle may be advisable.

Accordingly, a new family of polarized optical-quality plastic parts comprised of high impact, lightweight, high optical quality polymeric material, and methods of manufacturing such parts, are disclosed. While preferred embodiments are disclosed herein, many variations are possible which remain within the concept and scope of the invention. Such variations would become clear to one of ordinary skill in the art after inspection of the specification and drawings herein. The inventions therefore are not to be restricted except within the spirit and scope of the appended claims.

TABLE 1

Desired Material Attributes

| Lens Material | Lightweight = Low Density (g/cm3) | THIN—High Refractive Index | Good Optical Quality = High Abbe Number | Safety = High Impact Resistance |
|---|---|---|---|---|
| Glass | 2.2-2.54 | 1.45-1.7 | 64-67 (best) | Low, unless thick (heavy) |
| PMMA (Acrylic) | 1.19 | 1.491 | 57 | Marginal |
| CR-39 ® or Hard Resin | 1.32 | 1.498 | 58 | Marginal |
| Polycarbonate | 1.2 | 1.586 | 30-34.5 | High |
| Mid-index Plastics | 1.2 | 1.52-1.56 | 35-43 | Marginal |
| High Index Plastics | 1.3-1.4 | 1.59-1.67 (best) | 32-41 | Marginal |
| Inventors' Modified Polymeric Material | 1.11 (best) | 1.53 | 45.5 | High |

What is claimed is:

1. A method of manufacturing an optical-quality polarized part comprising:

forming a high impact polyurethane-based optical construct by admitting a liquid-phase polymeric material into a mold cavity, wherein the liquid-phase polymeric material is formulated to set within about 30 seconds, and wherein the mold cavity is defined in part by a sidefill gasket including one or more inlet port holes for admitting the liquid-phase polymeric material into the mold cavity to fill the mold cavity within about 30 seconds and further including an adjacent reservoir for supplying additional liquid-phase polymeric material into the mold cavity via the one or more inlet port holes as the admitted material shrinks during cure; and bonding a polarizer to the optical construct.

2. A method of manufacturing an optical-quality polarized part according to claim 1 wherein the polarizer comprises a polyethylene terephthalate film.

3. A method of manufacturing an optical-quality polarized part according to claim 1 further comprising the step of treating the polarizer for integral bonding to the optical construct.

4. A method of manufacturing an optical-quality polarized part according to claim 1 further comprising the step of applying a hard coating to the surface of the polarizer.

5. A method of manufacturing an optical-quality polarized part comprising:
   positioning a polarizer within a mold cavity that is defined in part by a sidefill gasket including one or more inlet port holes and an adjacent reservoir; and
   forming a high-impact, polyurethane-based optical construct by admitting a liquid-phase polymeric material into the mold cavity via the one or more inlet port holes, wherein the liquid-phase polymeric material is formulated to set within about 30 seconds, the reservoir thereafter supplying additional liquid-phase polymeric material into the mold cavity via the one or more inlet port holes as the previously admitted material shrinks during cure;
   wherein the method forms a solid polarized part with the polarizer at or near a front surface of the part.

6. A method of manufacturing an optical-quality polarized part according to claim 5 wherein the step of admitting liquid-phase polymeric material into the mold cavity includes admitting such material onto one side of the polarizer.

7. A method of manufacturing an optical-quality polarized part according to claim 5 wherein the step of admitting liquid-phase polymeric material into the mold cavity includes admitting such material onto both sides of the polarizer.

8. A method of manufacturing an optical-quality polarized part according to claim 7 wherein the step of admitting liquid-phase polymeric material into the mold cavity includes admitting such material simultaneously onto both sides of the polarizer.

9. A method of manufacturing an optical-quality polarized part according to claim 5 wherein:
   the sidefill gasket further includes one or more vent holes; and
   the step of forming includes venting gas and/or excess liquid-phase polymeric material from at least one side of the polarizer via the one or more vent holes.

10. A method of manufacturing an optical-quality polarized part according to claim 5 further comprising a step of applying a hard coating to the surface of the polarizer.

11. A method of manufacturing an optical-quality polarized part according to claim 5 further comprising a step of treating the surface of the polarizer for integral bonding to the part.

12. A method of manufacturing an optical-quality polarized part according to claim 5 wherein:
   the one or more inlet port holes of the sidefill gasket include a plurality of inlet port holes; and
   the step of admitting liquid-phase polymeric material into the mold cavity includes admitting such material via the plurality of inlet port holes onto both sides of the polarizer.

13. A method of manufacturing a polarized lens comprising:
   positioning a polarizer within a mold cavity that is defined in part by a sidefill gasket including one or more inlet port holes and an adjacent reservoir; and
   forming a high-impact, polyurethane-based optical construct by admitting a liquid-phase polymeric material into the mold cavity via the one or more inlet port holes, wherein the liquid-phase polymeric material is formulated to set within about 30 seconds, the reservoir thereafter supplying additional liquid-phase polymeric material into the mold cavity via the one or more inlet port holes as the previously admitted material shrinks during cure; and
   wherein the method forms a solid polarized lens with the polarizer at or near a front surface of the lens;
   and wherein the polarizer comprises a wafer.

14. A method of manufacturing a polarized lens according to claim 13 wherein:
   the sidefill gasket further includes one or more vent holes; and
   the method further includes a step of venting gas and/or excess liquid-phase polymeric material from at least one side of the polarizer via the one or more vent holes.

15. A method of manufacturing a polarized lens according to claim 13 further comprising a step of applying a hard coating to the surface of the polarizer.

16. A method of manufacturing a polarized lens according to claim 13 further comprising a step of treating the surface of the polarizer for integral bonding to the lens.

17. A method of manufacturing a polarized lens according to claim 13 wherein:
   the one or more inlet port holes of the sidefill gasket include a plurality of inlet port holes; and
   the step of admitting liquid-phase polymeric material into the mold cavity includes admitting such material via the plurality of inlet port holes onto both sides of the polarizer.

* * * * *

UNITED STATES PATENT AND TRADEMARK OFFICE
CERTIFICATE OF CORRECTION

PATENT NO.        : 7,582,235 B2
APPLICATION NO. : 10/624925
DATED             : September 1, 2009
INVENTOR(S)       : Russell E. Evans et al.

It is certified that error appears in the above-identified patent and that said Letters Patent is hereby corrected as shown below:

At column 3, line 9, "fast-reaching" should be -- fast-reacting. --.

At column 5, line 9, "WV" should be -- UV --.

At column 5, line 24, "result" should be -- results --.

At column 5, line 32, "convering" should be -- covering --.

At column 5, line 63, "birefringence" should be -- birefiringence --.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,582,235 B2  Page 1 of 1
APPLICATION NO. : 10/624925
DATED : September 1, 2009
INVENTOR(S) : Evans et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 576 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,582,235 B2  Page 1 of 1
APPLICATION NO. : 10/624925
DATED : September 1, 2009
INVENTOR(S) : Russell E. Evans et al.

It is certified that error appears in the above-identified patent and that said Letters Patent is hereby corrected as shown below:

At column 3, line 9, "fast-reaching" should be -- fast-reacting. --.

At column 5, line 9, "WV" should be -- UV --.

At column 5, line 24, "result" should be -- results --.

At column 5, line 32, "convering" should be -- covering --.

At column 5, line 32, "optial" should be -- optical --.

This certificate supersedes the Certificate of Correction issued December 22, 2009.

Signed and Sealed this

Twenty-third Day of November, 2010

David J. Kappos
*Director of the United States Patent and Trademark Office*